US006392861B1

(12) United States Patent
Trinh et al.

(10) Patent No.: US 6,392,861 B1
(45) Date of Patent: May 21, 2002

(54) SURGE ARRESTER HAVING DISCONNECTOR HOUSED BY MOUNTING BRACKET AND END CAP

(75) Inventors: Duc B. Trinh, Glendale Heights; Noel Apolinario, Woodridge; Frederick W. Burtelson, Harvard, all of IL (US)

(73) Assignee: Joslyn Manufacturing Co., Chicago, IL (US)

( * ) Notice: Subject to any disclaimer, the term of this patent is extended or adjusted under 35 U.S.C. 154(b) by 0 days.

(21) Appl. No.: 09/396,138

(22) Filed: Sep. 15, 1999

(51) Int. Cl.[7] .................................................. H02H 1/00

(52) U.S. Cl. ........................ 361/117; 361/118; 361/111; 361/124; 361/127; 361/126; 361/131

(58) Field of Search ................................ 361/117, 118, 361/111, 124, 127, 125, 126, 131, 93.7

(56) References Cited

U.S. PATENT DOCUMENTS 3,702,419 A 11/1972 Carothers et al. ............. 317/61
4,404,614 A 9/1983 Koch et al. ................. 361/128
4,609,902 A * 9/1986 Lenk ........................... 337/30
4,663,692 A 5/1987 Carothers et al. ........... 361/117
4,734,823 A 3/1988 Cunningham ............... 361/125
4,851,955 A 7/1989 Doone et al. ............... 361/117
5,113,167 A 5/1992 Raudabaugh ................ 337/30
5,296,998 A 3/1994 Jergenson et al. .......... 361/117
5,625,523 A 4/1997 Nedriga ...................... 361/127
5,721,664 A 2/1998 Uken et al. ................. 361/125
5,923,518 A * 7/1999 Hensley ...................... 361/117

FOREIGN PATENT DOCUMENTS

EP 0 655 814 5/1995

* cited by examiner

*Primary Examiner*—Josie Ballato
*Assistant Examiner*—Miguel Quinones
(74) *Attorney, Agent, or Firm*—Schiff Hardin & Waite

(57) ABSTRACT

A surge arrester includes a mounting bracket, a surge arresting element, an electrically conductive connector, and a fault disconnector. The mounting bracket forms a bracket cup. The surge arresting element is arranged to conduct in the presence of a surge. The electrically conductive connector is electrically coupled to the surge arresting element and forms a connector cup. The electrically conductive connector is received by the mounting bracket so that the bracket cup is received in the connector cup. The fault disconnector is arranged to disconnect the surge arresting element from an electrical line in the event of a fault, and the fault disconnector is housed within the housing formed by the connector cup and the bracket cup.

47 Claims, 6 Drawing Sheets

SURGE ARRESTER HAVING DISCONNECTOR HOUSED BY MOUNTING BRACKET AND END CAP

TECHNICAL FIELD OF THE INVENTION

The present invention relates to a surge arrester for shunting electrical surges to ground. More particularly, the surge arrester of the present invention may have a disconnect which disconnects the surge arrester from ground in the event of a failure of the surge arrester.

BACKGROUND OF THE INVENTION

Over voltage surges, which travel along an electric power distribution system and which are not properly averted or diverted, often damage transformers and other electrical equipment of the electric power distribution system, as well as the electrical equipment of residential, commercial and industrial customers supplied by the electric power distribution system. Consequently, surge arresters are commonly used in an electric power distribution system for shunting over voltage surges to system ground before the over voltage surges can damage the electrical equipment connected in, or to, the electric power distribution system.

Typical surge arresters used in electric power distribution systems can fail in a runaway condition. When such a failure occurs, the surge arrester may explode apart, potentially damaging nearby equipment and injuring anyone who happens to be near. Therefore, it has been a common prior art practice to provide surge arresters with fault disconnectors that open the circuits containing failed surge arresters. Usually, a fault disconnector is connected between its corresponding surge arrester and ground so that, when the fault disconnector activates upon failure of the surge arrester, the fault disconnector separates the surge arrester from its ground connection. The separated ground connection not only disconnects the failed,surge arrester from the electric power distribution system, but also provides a visible indication to a utility linesman that the surge arrester has failed.

A typical fault disconnector includes a cartridge, which may contain a predetermined amount of gun powder, and which is heated as the surge arrester begins to fail. When the cartridge heats sufficiently, it explodes separating the surge arrester from its ground connection. The amount of gun powder that is used in the cartridge is sufficient to cause such separation but not sufficient to cause damage or injury.

The cartridge, and the other elements of the fault disconnector, are contained within a disconnector housing that is a separate component of the surge arrester. The disconnector housing has an internally threaded hole for threaded attachment to the surge arrester, and has an external threaded ground connector, for attachment to a ground lead. An electrical resistor, which is another element of the fault disconnector and which is housed by the disconnector housing, is electrically connected between a surge arrester terminal and the ground connector, of the disconnector. Accordingly, when the surge arrestor fails, the current through the electrical resistor increases abnormally and generates enough heat to trigger the cartridge causing it to break the disconnector housing and to separate the ground terminal from the surge arrester.

The use of a separate disconnector housing increases the part count of a surge arrester which, in turn, increases the manufacturing cost of the surge arrester. The invention disclosed in U.S. application Ser. No. 08/954,987 filed on Oct. 21, 1997 now U.S. Pat. No. 5,923,518, is directed to a surge arrester which reduces part count by housing the fault disconnector in an end cap of a surge arrester.

The present invention is a further improvement and is directed to a surge arrester in which the fault disconnector is housed in a cavity formed between the end cap and the mounting bracket. This arrangement makes the surge arrester easier to automate its assembly and/or reduces voids in the disconnector housing so that air holes are reduced when the end of the surge arrester is potted.

SUMMARY OF THE INVENTION

In accordance with one aspect of the present invention, a surge arrester comprises a mounting bracket, a surge arresting element, an end cap, and a fault disconnector. The mounting bracket has a bracket recess. The surge arresting element is arranged to break down and conduct in the presence of a surge. The end cap is electrically coupled to the surge arresting element. The end cap has a cap recess, and the end cap is received by the mounting bracket so that the bracket recess and the cap recess cooperate to form a housing cavity therebetween. The fault disconnector is arranged to disconnect the surge arresting element from an electrical line in the event of a fault, and the fault disconnector is at least partially housed within the housing cavity.

In accordance with another aspect of the present invention, a surge arrester comprises a mounting bracket, a surge arresting element, a conductive end cup, and a fault disconnector. The mounting bracket forms a bracket cup having a bottom and a cup wall. The surge arresting element is arranged to conduct in the presence of a surge. The conductive end cup is electrically coupled to the surge arresting element, and the conductive end cup has a bottom and an end cup wall. The bracket cup is housed within the conductive end cup. The fault disconnector is arranged to disconnect the surge arresting element from an electrical line in the event of a fault, and the fault disconnector is at least partially housed within the bracket cup.

In accordance with yet another aspect of the present invention, a surge arrester comprises a mounting bracket, a surge arresting element, an electrically conductive connector, and a fault disconnector. The mounting bracket has first and second bracket walls. The first and second bracket walls form an opening therebetween, and the second bracket wall is attached to the first bracket wall by at least one bridge. The surge arresting element is arranged to conduct in the presence of a surge. The electrically conductive connector is electrically coupled to the surge arresting element, and the electrically conductive connector has a connector wall forming a connector recess. The connector wall has at least one slot. The electrically conductive connector is received by the mounting bracket so that the connector wall is received in the opening, so that the second bracket wall is received within the connector wall, and so that the bridge is received in the slot. The fault disconnector is arranged to disconnect the surge arresting element from an electrical line in the event of a fault. The fault disconnector is housed within the second bracket wall of the mounting bracket.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
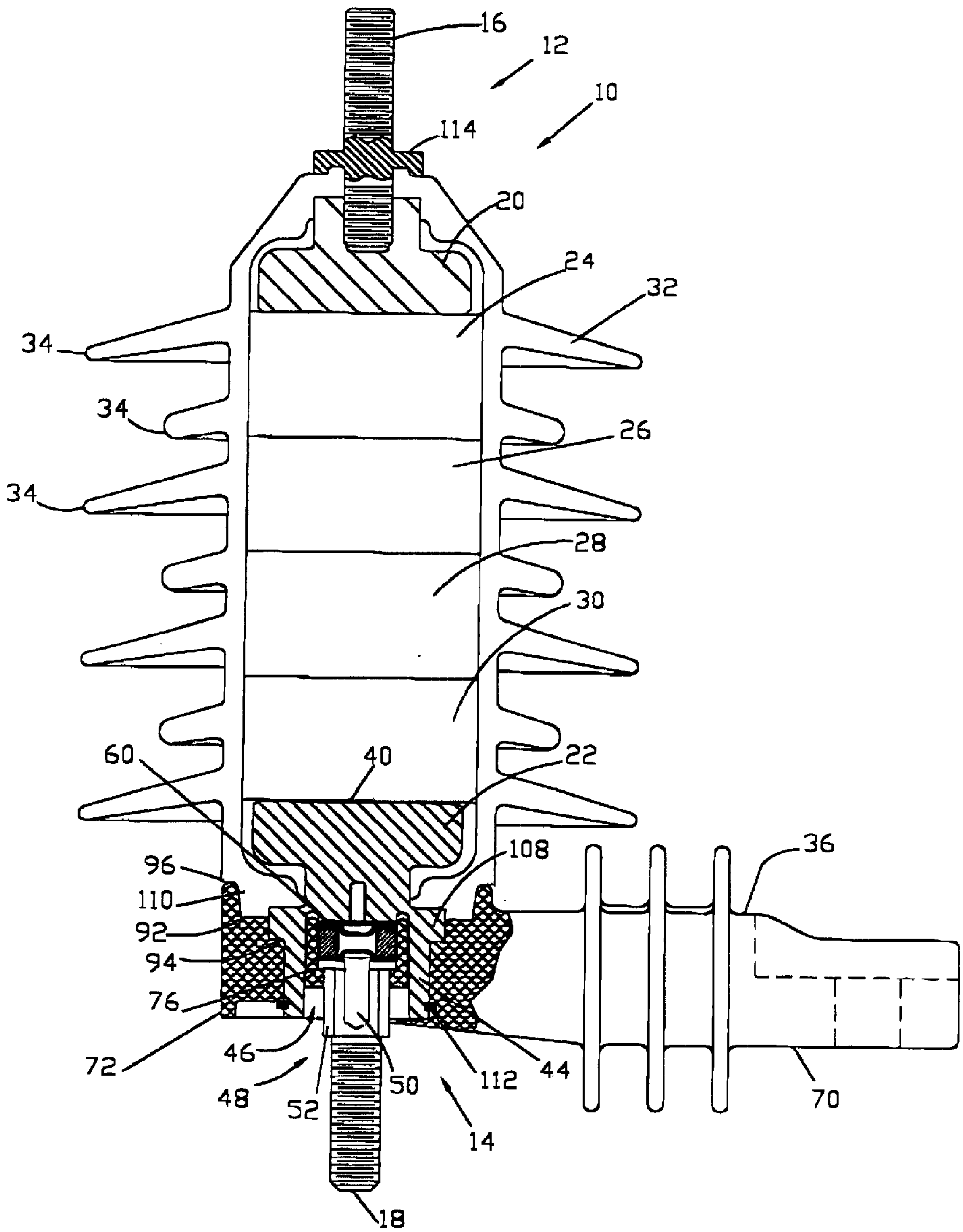
FIG. 1 illustrates a surge arrester that includes a fault disconnector housed in accordance with the present invention.

As shown in FIG. 1, a surge arrester 10 includes a first terminal end 12 and a second terminal end 14. The first terminal end 12 includes a first connector 16 which is used to electrically connect the surge arrester 10 to a first electrical line. The second terminal end 14 includes a second connector 18 which is used to electrically connect the surge arrester 10 to a second electrical line. The first electrical line may be, for example, an electrically conducting lead which connects the first connector 16 to a high voltage line of an electrical power distribution system, and the second electrical line may be an electrically conducting lead which connects the second connector 18 to ground. Alternatively, however, the first electrical line may be, for example, an electrically conducting lead which connects the first connector 16 to ground, and the second electrical line may be an electrically conducting lead which connects the second connector 18 to a high voltage line of an electrical power distribution system.

The first connector 16 is threaded into a first end cap 20, and the second connector 18 is electrically coupled to a second end cap 22 in a manner to be described below. The first and second end caps 20 and 22 are electrically conductive and, for example, may be formed from aluminum. A first surge arresting element 24 is in electrical contact with the first end cap 20, a second surge arresting element 26 is in electrical contact with the first surge arresting element 24, a third surge arresting element 28 is in electrical contact with the second surge arresting element 26, and a fourth surge arresting element 30 is in electrical contact with both the third surge arresting element 28 and the second end cap 22. Accordingly, a series circuit is formed between the first and second end caps 20 and 22. The surge arresting elements 24–30 may be metal oxide varistor blocks, for example, which conduct in the presence of surges in order to shunt the surge energy in the electric power distribution system between the first and second connectors 16 and 18.

An arrester housing 32 houses the first and second end caps 20 and 22 and the surge arresting elements 24, 26, 28, and 30. As is known, the arrester housing 32 may be an insulating polymeric or porcelain housing having a plurality of polymeric or porcelain water sheds 34. A mounting bracket 36 is provided in order to mount and support the surge arrester 10 to a utility pole or other apparatus of an electric power distribution system.

As shown in FIGS. 1, 2, and 6–8, the second end cap 22 has a first end 40 which is in electrical contact with the fourth surge arresting element 30. The second end cap 22 also has a second end 42 which comprises a wall 44 defining a recess 46. As shown in FIGS. 2 and 6–8, the second end cap 22 generally has the shape of a cup. A fault disconnector 48 includes a cartridge 50 which may be alternatively referred to herein as a separation element and which is contained within an end 52 of the second connector 18. The fault disconnector 48 also includes a first electrically conductive washer 54 abutting an end 56 of the second connector 18, a second electrically conductive washer 58 and a wave spring 60 abutting an internal wall 62 of the second end cap 22, and a resistor 64 sandwiched between the first and second electrically conductive washers 54 and 58. The wall 44 of the second end cap 22 has a circumferential groove 68 therearound.

As shown in FIGS. 1 and 3–5, the mounting bracket 36 has first and second ends 70 and 72. The first end 70 may be used to support the mounting bracket 36 on a utility pole or other support apparatus of an electric power distribution system, and the second end 72 is used to mount the surge arrester 10 on the mounting bracket 36.

The second end 72 of the mounting bracket 36 has first and second walls 74 and 76 forming crescent shaped openings 78 and 80 therebetween. The first wall 74 is formed in the main body of the mounting bracket 36, and bridges 82 and 84 support the second wall 76 to the first wall 74. The bridges 82 and 84 divide the openings 78 and 80 from one another. The second wall 76 and a flange 88 at one end thereof form a bracket cup 86. The flange 88 has a octagonal opening 90 therethrough.

The mounting bracket 36 has a first recess 92 and a second recess 94 which are concentric with respect to one another. The first recess 92 is formed by a generally cylindrical wall 96 of the mounting bracket 36. The generally cylindrical wall 96 may have an internal taper.

During assembly of the surge arrester 10, the surge arresting elements 24, 26, 28, and 30 are stacked between the first and second end caps 20 and 22. The stack formed by the surge arresting elements 24, 26, 28, and 30 and the first and second end caps 20 and 22 is wrapped with a fiber glass weave in order to retain the surge arresting elements 24, 26, 28, and 30 and the first and second end caps 20 and 22 in the stack. The arrester housing 32 is applied to the wrapped stack of the surge arresting elements 24, 26, 28, and 30 and the first and second end caps 20 and 22 as shown in FIG. 1. For example, the arrester housing 32 may be molded directly on the wrapped stack of the surge arresting elements 24, 26, 28, and 30 and the first and second end caps 20 and 22.

The second connector 18 with the cartridge 50 is inserted through the bracket cup 86 and through the octagonal opening 90 until a flange 104 of the second connector 18 abuts the flange 88 and resides in the bracket cup 86 of the mounting bracket 36. The following elements are next inserted into the bracket cup 86 in the stated order: the first electrically conductive washer 54; the resistor 64; the second electrically conductive washer 58; and the wave spring 60. The second end 42 of the second end cap 22 is then inserted through the first and second recesses 92 and 94 and through the openings 78 and 80 so that (i) the second end 42 exits the mounting bracket 36 beyond the bracket cup 86, (ii) slots 100 and 102 in the wall 44 accommodate the bridges 82 and 84, (iii) the bracket cup 86 contains the wave spring 60, the first and second electrically conductive washers 54 and 58, and the resistor 64, (iv) the first electrically conductive washer 54 abuts the end 56 of the second connector 18, the wave spring 60 abuts the internal wall 62, the second electrically conductive washer 58 abuts the wave spring 60, and the resistor 64 is sandwiched between the first and second electrically conductive washers 54 and 58, and (v) the bracket cup 86 resides within the cup defined by the wall

44 and the recess 46. Also, the end 52 of the second connector 18 may be octagonal in order to mate with the octagonal opening 90 so as to prevent turning of the second connector 18 with respect to the mounting bracket 36 when torque is applied to the second connector 18.

Figure 2:
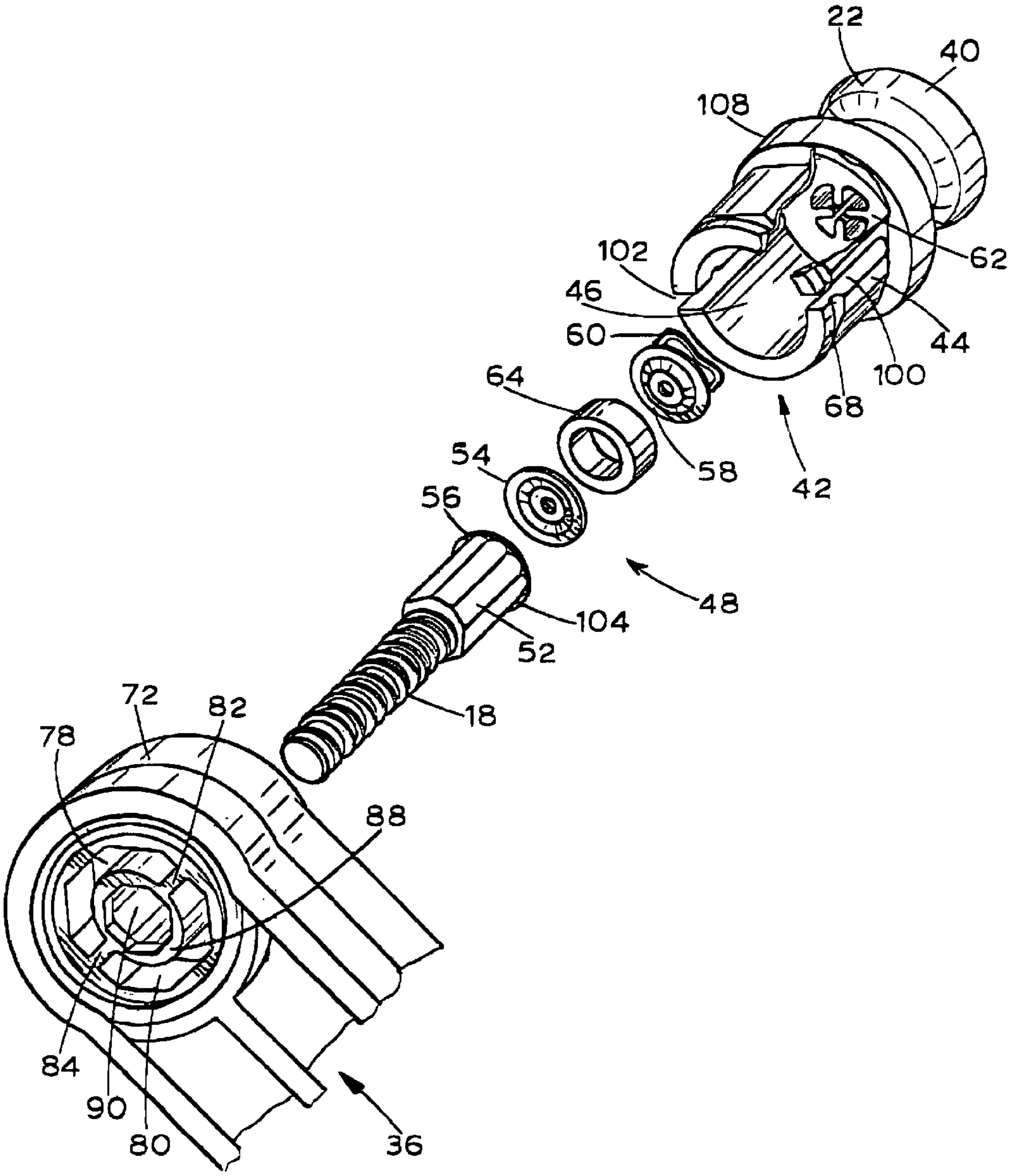
FIG. 2 is an exploded view of the fault disconnector and disconnector housing illustrated in FIG. 1.
Figure 3:
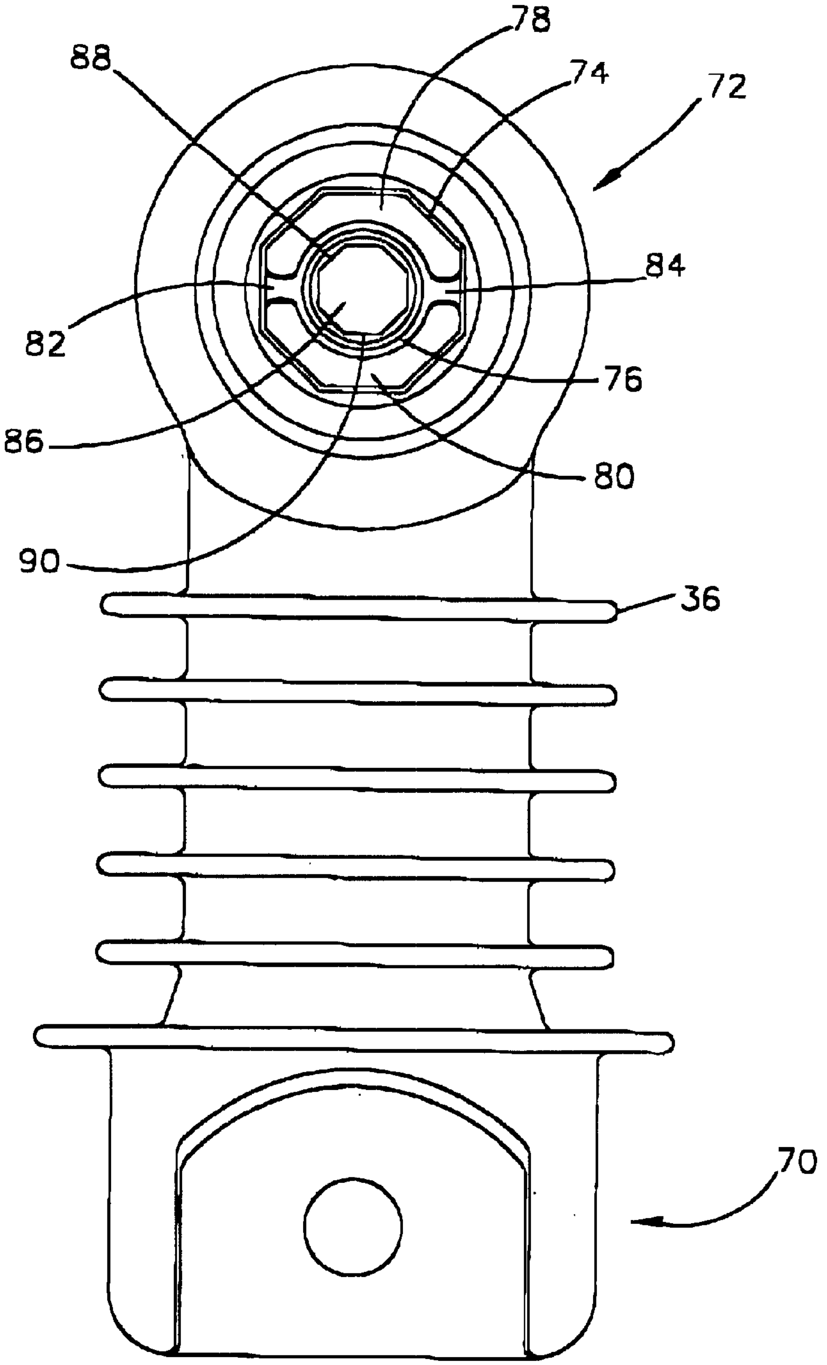
FIG. 3 is a top view of the mounting bracket shown in FIG. 1.
Figure 4:
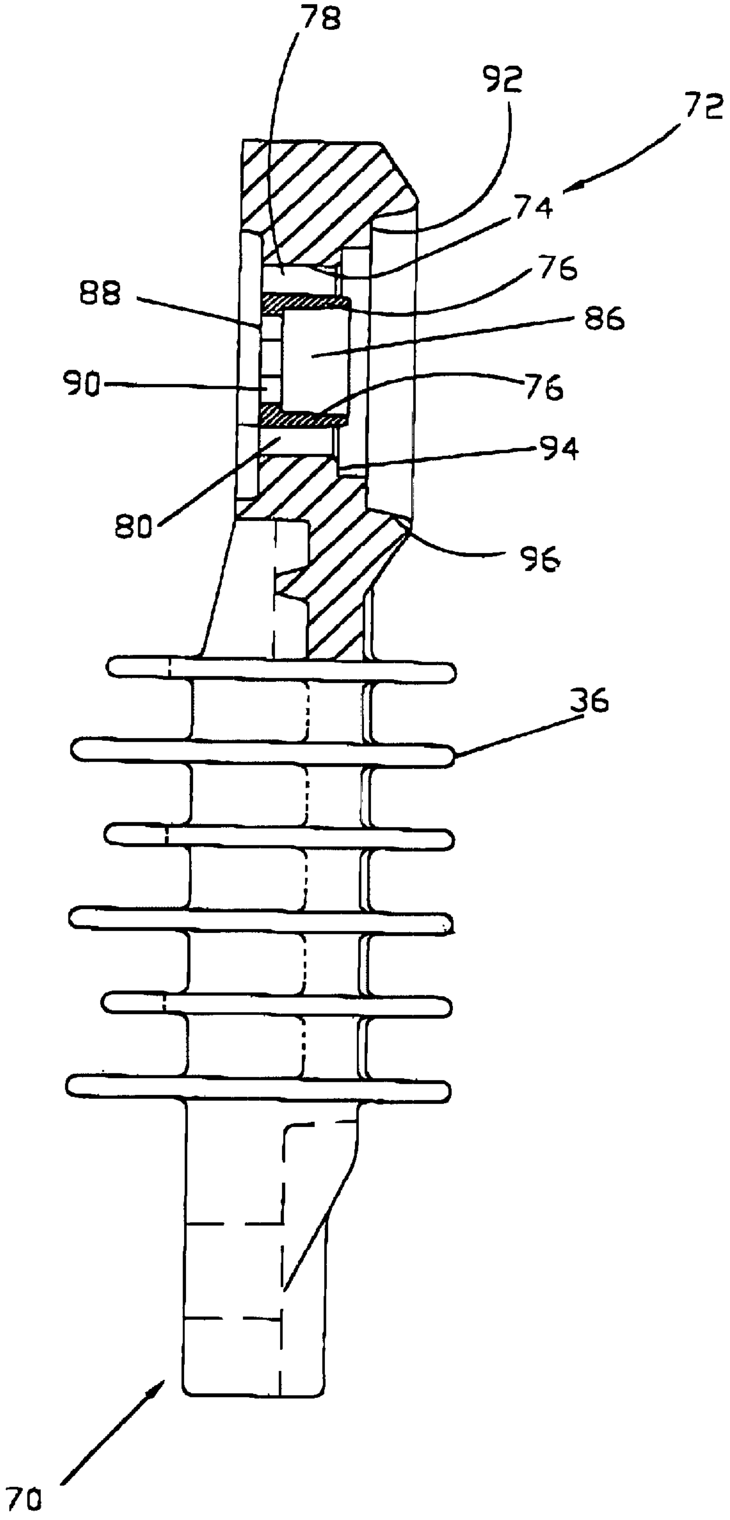
FIG. 4 is a partially cross sectioned side view of the mounting bracket shown in FIG. 1.
Figure 5:
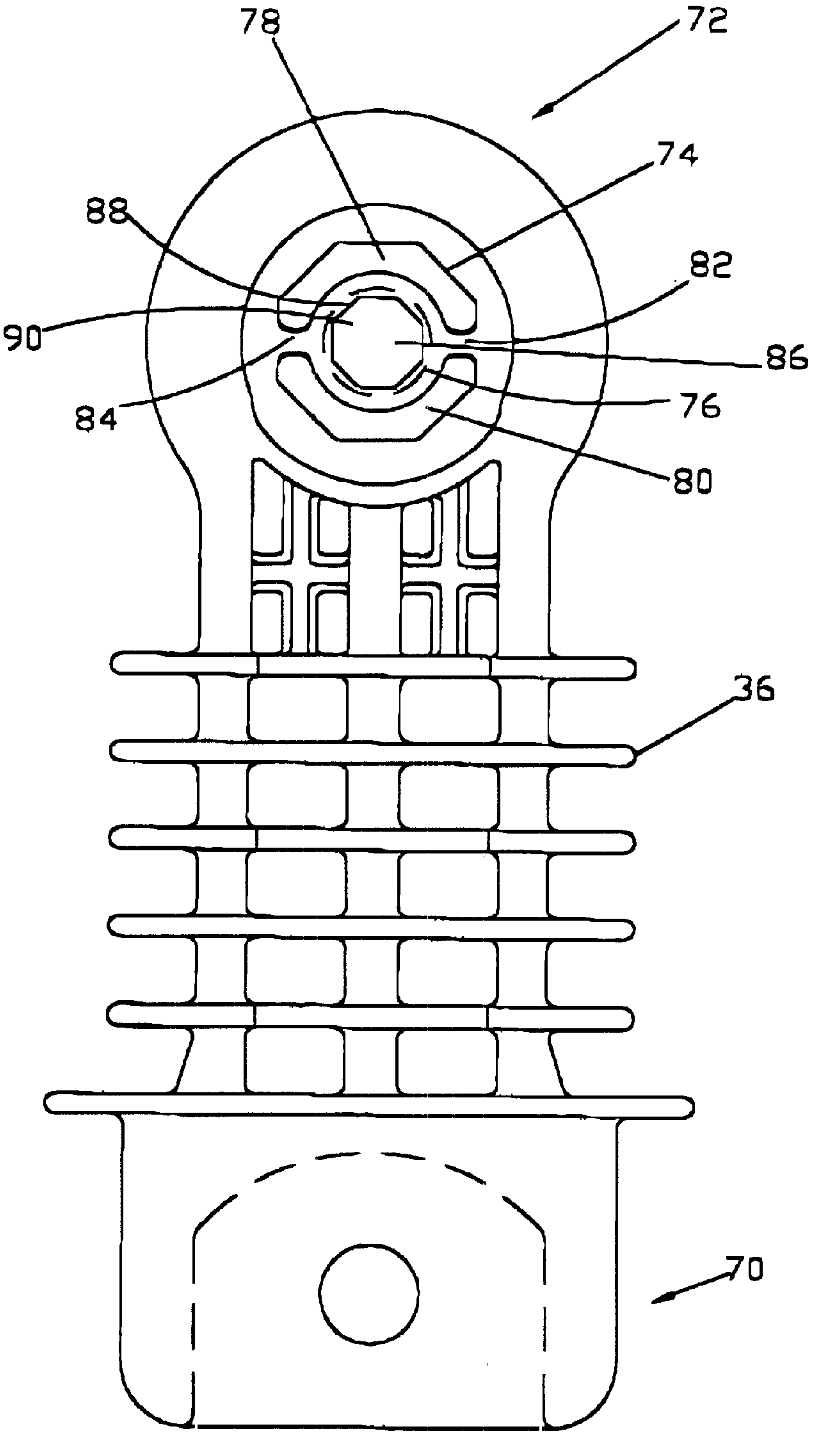
FIG. 5 is a bottom view of the mounting bracket shown in FIG. 1.
Figure 6:
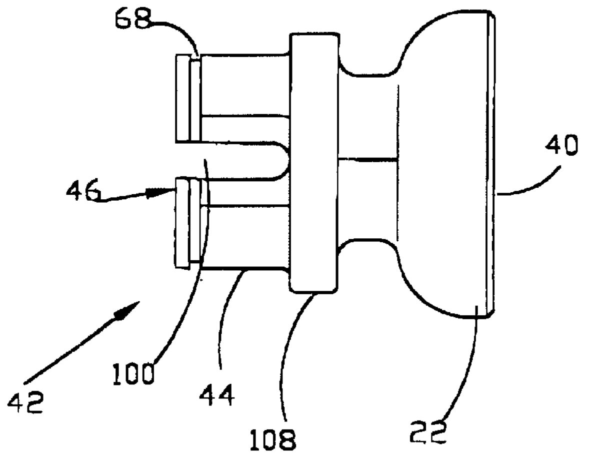
FIG. 6 is a side view of the end cap that is shown in FIG. 1 and that, along with the mounting bracket, forms the disconnector housing.
Figure 7:
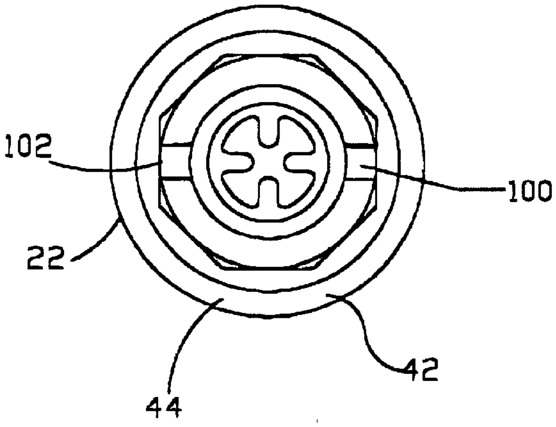
FIG. 7 is an end view of the end cap shown in FIG. 6.
Figure 8:
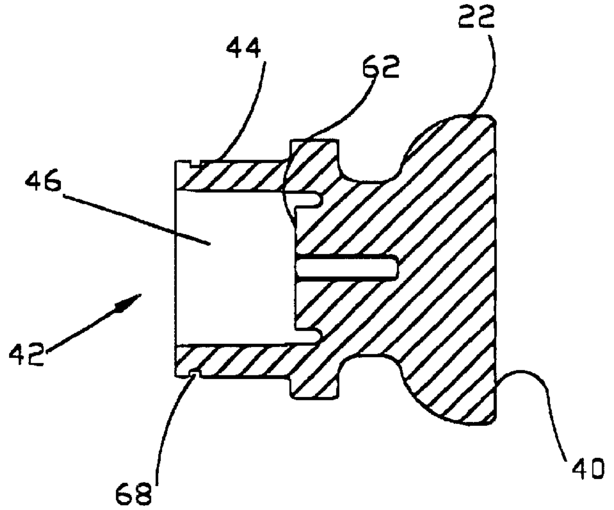
FIG. 8 is a cross sectional side view of the end cap shown in FIG. 6.

Accordingly, a housing cavity is formed by the cooperation of the bracket cup 86 and the cup defined by the wall 44 and the recess 46. This housing cavity contains the wave spring 60, the first and second electrically conductive washers 54 and 58, and the resistor 64 when the fault disconnector 48 is assembled as shown in FIGS. 1 and 2. Thus, the second wall 76 of the mounting bracket 36 insulates the resistor 64 and the first and second electrically conductive washers 54 and 58 from the wall 44 of the second end cap 22 forcing fault current to flow from the second end cap 22 through the wave spring 60, through the second electrically conductive washer 58, through the resistor 64, through the first electrically conductive washer 54, and through the second connector 18.

As the second end 42 of the second end cap 22 is pushed through the openings 78 and 80 in the mounting bracket 36, a flange 108 of the second end cap 22 enters the second recess 94 of the mounting bracket 36, and the taper of the generally cylindrical wall 96 causes an end portion 110 of the arrester housing 32 to be squeezed between the generally cylindrical wall 96 and the portion of the flange 108 of the second end cap 22 that remains in the first recess 92. As a result of this squeezing action, the end portion 110 acts as a gasket or seal at the second terminal end 14 in order to isolate the interior of the arrester housing 32 from the external environment.

When the second end 42 of the second end cap 22 is fully pressed through the openings 78 and 80 in the mounting bracket 36, a snap ring 112 shown in FIG. 1 is snapped into the circumferential groove 68 in the wall 44 of the second end cap 22 in order to thereby clamp the surge arrester 10 to the mounting bracket 36 with enough force to maintain the seal by the end portion 110 between the generally cylindrical wall 96 and the flange 108 of the second end cap 22.

An epoxy potting material may be applied to the area around the snap ring 112 and the second end 42 of the second end cap 22 that protrudes through the openings 78 and 80 of the mounting bracket 36 in order to seal the second end cap 22.

Accordingly, the bracket cup 86 and the cup defined by the wall 44 and the recess 46 cooperate to form a disconnector housing for at least a portion of the fault disconnector 48 so as to eliminate the need for a separate housing for the fault disconnector 48 and so as to make assembly of the surge arrester 10 easier to automate and/or to reduce voids in the disconnector housing so that air holes are reduced when the end of the surge arrester is potted.

Instead of using the snap ring 112 in the circumferential groove 68 of the second end cap 22 in order to clamp the first and second end caps 20 and 22, the surge arresting elements 24, 26, 28, and 30, and the arrester housing 32 to the mounting bracket 36, the second end cap 22 may be threaded into the mounting bracket 36. To this end, the second end cap 22 may be externally and/or internally threaded.

As shown in FIG. 1, the arrester housing 32 is formed over the first end cap 20 so as to provide a seal in cooperation with a flange 114 of the first connector 16. This seal at the first terminal end 12 isolates the interior of the arrester housing 32 from the external environment. Alternatively, the arrester housing 32 may be configured with an integral O-ring which can be made to fit within an annular groove about the first end cap 20 in order to provide a seal at the first terminal end 12 that isolates the interior of the arrester housing 32 from the external environment.

As a further alternative, an integral O-ring may be integrally formed in the arrester housing 32 at its top in order to define an opening through which the first connector 16 extends so that it may be threaded into the first end cap 20. This integral O-ring can be made to fit within an annular recess formed in the first connector 16. As the first connector 16 is threaded into the first end cap 20, this integral O-ring is tightly squeezed into the annular recess and cooperates with the first end cap 20 in order to provide a seal at the first terminal end 12 that isolates the interior of the arrester housing 32 from the external environment.

Certain modifications of the present invention have been discussed above. Other modifications will occur to those practicing in the art of the present invention. For example, the first connector 16 and the first end cap 20 are shown as being separate elements. Instead, the first connector 16 and the first end cap 20 may be formed as a single, integrated, electrically conductive element.

Also, four surge arresting elements 24, 26, 28, and 30 are shown in FIG. 1 as being electrically connected between the first and second end caps 20 and 22. However, any number of surge arresting elements, such as one or more, may be provided between the first and second end caps 20 and 22 depending upon the voltage carried by the electric power distribution system and/or depending upon the particular construction of the surge arresting elements.

Moreover, the surge arrester 10 is described above as being assembled in a particular order. Instead, the surge arrester 10 may be assembled in any desired order.

Additionally, the first and second end caps 20 and 22 may be referred to as surge arresting elements insofar as they facilitate the surge arresting function described above. The first and second end caps 20 and 22 may be alternatively referred to as end plugs.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A surge arrester comprising:

a mounting bracket having a bracket recess;

a surge arresting element, wherein the surge arresting element is arranged to break down and conduct in the presence of a surge;

an end cap electrically coupled to the surge arresting element, wherein the end cap has a cap recess, and wherein the end cap is received by the mounting bracket so that the bracket recess and the cap recess cooperate to form a housing cavity therebetween; and, a fault disconnector arranged to disconnect the surge arresting element from an electrical line in the event of a fault, wherein the fault disconnector is at least partially housed within the housing cavity.

2. The surge arrester of claim 1 wherein the surge arresting element is a metal oxide varistor.

3. The surge arrester of claim 1 wherein the end cap has first and second ends, wherein the first end is electrically coupled to the surge arresting element, and wherein the second end forms the cap recess.

4. The surge arrester of claim 3 wherein the first end is in direct electrical engagement with the surge arresting element.

5. The surge arrester of claim 1 wherein the surge arresting element, the end cap, and the fault disconnector are fastened to the mounting bracket by a fastener so that the mounting bracket is clamped between the end cap and the fastener.

6. The surge arrester of claim 5 wherein the fastener is a snap ring.

7. The surge arrester of claim 5 wherein the end cap has a first end electrically coupled to the surge arresting element and a second end protruding through the mounting bracket, and wherein the fastener engages the second end of the end cap.

8. The surge arrester of claim 7 wherein the second end of the end cap has a groove, and wherein the fastener engages the groove in the second end of the end cap.

9. The surge arrester of claim 8 wherein the fastener is a snap ring.

10. The surge arrester of claim 5 further comprising an arrester housing for housing the surge arresting element and the end cap, wherein the arrester housing is wedged between the mounting bracket and the end cap when the mounting bracket is clamped between the end cap and the fastener so as to form a seal.

11. The surge arrester of claim 5 further comprising an arrester housing for housing the surge arresting element and the end cap, wherein the bracket recess is a first bracket recess, wherein the mounting bracket has a second bracket recess, wherein the second bracket recess is formed by a wall of the mounting bracket, wherein the wall is tapered, wherein the second bracket recess receives a flange of the end cap, and wherein the arrester housing is wedged between the tapered wall of the mounting bracket and the flange of the end cap when the mounting bracket is clamped between the end cap and the fastener so as to form a seal.

12. The surge arrester of claim 1 further comprising an arrester housing for housing the surge arresting element and the end cap, wherein the arrester housing forms a seal with respect to the mounting bracket and the end cap.

13. The surge arrester of claim 1 wherein the fault disconnector comprises an electrical connector and a separation element, wherein the electrical connector and the separation element protrude through the bracket recess away from the end cap, and wherein the electrical connector comprises a flange retained in the bracket recess.

14. The surge arrester of claim 13 wherein the electrical connector mates with a wall of the bracket recess so as to prevent rotation of the electrical connector with respect to the mounting bracket.

15. The surge arrester of claim 13 wherein the fault disconnector further comprises an electrical resistor housed within the housing cavity.

16. The surge arrester of claim 1 wherein the fault disconnector comprises an electrical resistor housed within the housing cavity.

17. The surge arrester of claim 1 wherein the fault disconnector is at least partially housed within both the cap recess and the bracket recess.

18. A surge arrester comprising:

a mounting bracket forming a bracket cup having a bracket cup bottom and a bracket cup wall;

a surge arresting element, wherein the surge arresting element is arranged to conduct in the presence of a surge;

a conductive end cup electrically coupled to the surge arresting element, wherein the conductive end cup has an end cup bottom and an end cup wall, and wherein the bracket cup is housed within the conductive end cup; and, a fault disconnector arranged to disconnect the surge arresting element from an electrical line in the event of a fault, wherein the fault disconnector is at least partially housed within the bracket cup.

19. The surge arrester of claim 18 wherein the end cup bottom is in direct electrical engagement with the surge arresting element.

20. The surge arrester of claim 18 wherein the surge arresting element, the conductive end cup, and the fault disconnector are fastened to the mounting bracket by a fastener so that the mounting bracket is clamped between the conductive end cup and the fastener.

21. The surge arrester of claim 20 wherein the fastener is a snap ring.

22. The surge arrester of claim 20 wherein the end cup wall protrudes through the mounting bracket, and wherein the fastener engages the protruding end cup wall.

23. The surge arrester of claim 22 wherein the protruding end cup wall has a groove, and wherein the fastener engages the groove in the protruding end cup wall.

24. The surge arrester of claim 23 wherein the fastener is a snap ring.

25. The surge arrester of claim 20 further comprising an arrester housing for housing the surge arresting element and the conductive end cup, wherein the arrester housing is wedged between the mounting bracket and the conductive end cup when the mounting bracket is clamped between the conductive end cup and the fastener so as to form a seal.

26. The surge arrester of claim 20 further comprising an arrester housing for housing the surge arresting element and the conductive end cup, wherein the mounting bracket has a bracket recess, wherein the bracket recess is formed by a bracket wall of the mounting bracket, wherein the bracket wall is tapered, wherein the bracket recess receives a flange of the conductive end cup, and wherein the arrester housing is wedged between the tapered wall of the mounting bracket and the flange of the conductive end cup when the mounting bracket is clamped between the conductive end cup and the fastener so as to form a seal.

27. The surge arrester of claim 18 further comprising an arrester housing for housing the surge arresting element and the conductive end cup, wherein the arrester housing forms a seal with respect to the mounting bracket and the conductive end cup.

28. The surge arrester of claim 18 wherein the fault disconnector comprises an electrical connector and a separation element, wherein the electrical connector and the separation element protrude through the bottom of the bracket cup away from the conductive end cup, wherein the electrical connector comprises a flange retained in the bracket cup, and wherein the flange is retained in the bracket cup by the bottom of the conductive end cup.

29. The surge arrester of claim 28 wherein the electrical connector mates with the bracket cup so as to prevent rotation of the electrical connector with respect to the mounting bracket.

30. The surge arrester of claim 28 wherein the fault disconnector further comprises an electrical resistor housed within the bracket cup.

31. The surge arrester of claim 18 wherein the fault disconnector comprises an electrical resistor housed within the bracket cup.

32. The surge arrester of claim 18 wherein the bracket cup and the conductive cup are disposed with respect to one another such that the fault disconnector is at least partially housed between the bracket cup bottom and the end cup bottom.

33. The surge arrester of claim 18 wherein the bracket cup wall is disposed within the end cup wall.

34. A surge arrester comprising:

a mounting bracket having first and second bracket walls, wherein the first and second bracket walls form an opening therebetween, and wherein the second bracket wall is attached to the first bracket wall by at least one bridge;

a surge arresting element, wherein the surge arresting element is arranged to conduct in the presence of a surge;

an electrically conductive connector electrically coupled to the surge arresting element, wherein the electrically conductive connector has a connector wall forming a connector recess, wherein the connector wall has at least one slot, and wherein the electrically conductive connector is received by the mounting bracket so that the connector wall is received in the opening, so that the second bracket wall is received within the connector wall, and so that the bridge is received in the slot; and, a fault disconnector arranged to disconnect the surge arresting element from an electrical line in the event of a fault, wherein the fault disconnector is housed within the second bracket wall of the mounting bracket.

35. The surge arrester of claim 34 wherein the surge arresting element, the electrically conductive connector, and the fault disconnector are fastened to the mounting bracket by a fastener so that the mounting bracket is clamped between the electrically conductive connector and the fastener.

36. The surge arrester of claim 35 wherein the fastener is a snap ring.

37. The surge arrester of claim 35 wherein the electrically conductive connector has a first end electrically coupled to the surge arresting element and a second end protruding through the opening of the mounting bracket, and wherein the fastener engages the protruding second end of the electrically conductive connector.

38. The surge arrester of claim 37 wherein the protruding second end of the electrically conductive connector has a groove, and wherein the fastener engages the groove in the protruding second end of the electrically conductive connector.

39. The surge arrester of claim 38 wherein the fastener is a snap ring.

40. The surge arrester of claim 35 further comprising an arrester housing for housing the surge arresting element and the electrically conductive connector, and wherein the arrester housing is wedged between the mounting bracket and the electrically conductive connector when the mounting bracket is clamped between the electrically conductive connector and the fastener so as to form a seal.

41. The surge arrester of claim 34 further comprising an arrester housing for housing the surge arresting element and the electrically conductive connector, wherein the arrester housing forms a seal with respect to the mounting bracket and the electrically conductive connector.

42. The surge arrester of claim 34 wherein the fault disconnector comprises an electrical contact and a separation element, wherein the electrical contact and the separation element protrude through the opening away from the electrically conductive connector, wherein the electrical connector comprises a flange retained in the second bracket wall, and wherein the flange is retained in the second bracket wall by the connector recess.

43. The surge arrester of claim 42 wherein the electrical contact mates with the second bracket wall so as to prevent rotation of the electrical contact with respect to the mounting bracket.

44. The surge arrester of claim 42 wherein the fault disconnector further comprises an electrical resistor housed within the second bracket wall of the mounting bracket.

45. The surge arrester of claim 34 wherein the fault disconnector comprises an electrical resistor housed within the second bracket wall of the mounting bracket.

46. The surge arrester of claim 32 wherein one of the bracket cup wall and the end cup wall is disposed within the other of the bracket cup wall and the end cup wall.

47. The surge arrester of claim 46 wherein the bracket cup wall is disposed within the end cup wall.

* * * * *